United States Patent Office 3,265,422
Patented August 9, 1966

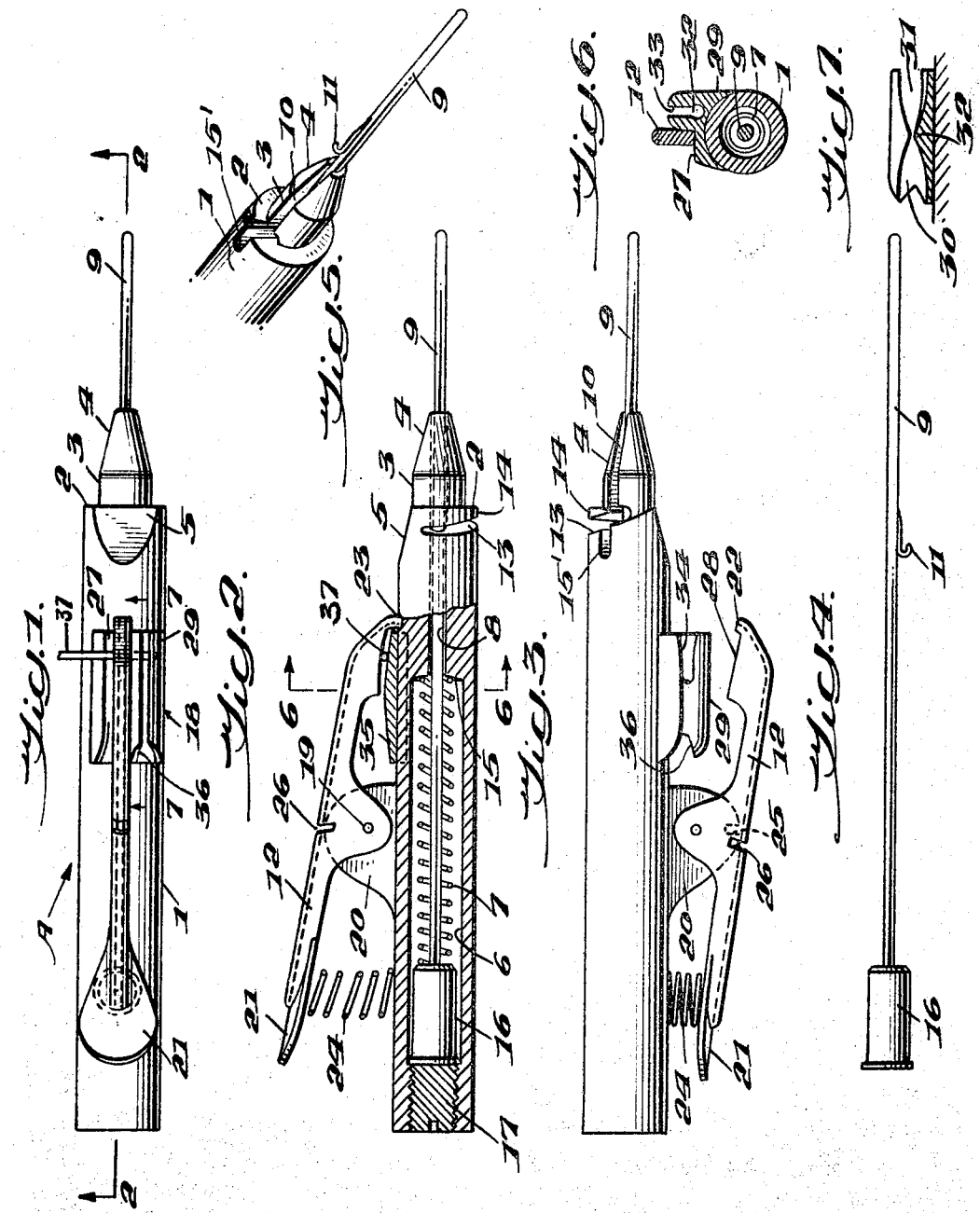

1

3,265,422
THREADING AND KNOT TYING DEVICE
FOR FISH HOOKS
Louis Bryan Pierce, 516 W. Jackson St., Medford, Oreg.
Filed Aug. 4, 1964, Ser. No. 387,365
8 Claims. (Cl. 289—17)

This invention relates to a knot tying device.

An object of the invention is to provide a unitary device adapted to be carried in a pocket and that readily may be used by a person having very little skill or experience to tie a good knot of a fish line or leader to a fish hook.

Another object of the invention is to provide means for holding the fish hook with its eye positioned in alignment with a guide for guiding the fish line through the eye of the fish hook and thus to facilitate the threading of the line through the eye of the hook and to avoid holding the hook in the fingers with the attendant danger of injury.

Other objects and advantages of the invention will appear from the following detailed description of the invention in conjunction with the accompanying drawings in which FIG. 1 is a top plan view of the knot tying device;

FIG. 2 is a section on the line 2—2 of FIG. 1;

FIG. 3 is a side elevational view of the device in inverted position;

FIG. 4 is a plan view of the sliding pin of the device;

FIG. 5 is a perspective view of the front end of the device;

FIG. 6 is a section on the line 6—6 of FIG. 2; and

FIG. 7 is a longitudinal axial section of the part of the device hereinafter referred to as the threader.

Referring to the drawings A is the body or handle of the device, formed of wood or other suitable material such as metal or synthetic resin or plastic. Externally the body A has a main rear cylindrical portion 1, the front end portion of the body being shaped to provide the shoulder 2, the relatively short smaller cylindrical portion 3, the tapered end portion 4 and the flat or concave area 5. Interiorly the body has in the rear portion thereof a cylindrical bore 6 of sufficient size to house the spring 7 and in the front portion thereof the smaller bore 8 of such size as to guide and permit free sliding movement of the rod or pin 9. In addition the body has a groove 10 (see FIG. 5) extending radially outwardly from the bore 8 to the surface of the handle and rearwardly through the tapered end 4, the cylindrical portion 3 and for a short distance into the cylindrical portion 1. Groove 10 is of sufficient width to permit longitudinal movement of the hook or spur 11 carried on the rod 9. It is noted that groove 10 is not diametrically opposite to the clip 12 but extends rearwardly as viewed in FIG. 2 at an angle of 20 to 30° to the plane of the paper. This angular arrangement of the groove 10 is apparent also from FIG. 3.

The body A has a further groove 13 shown in FIGS. 2 and 3 which extends spirally around and rearwardly of the body 1 starting at the intersection of the shoulder 2 with the rear edge of the area 5 as viewed in FIG. 1, across the groove 10 slightly in front of the rear end thereof to a point adjacent to the front edge of the area 5. Thus it will be seen that the groove 13 removes that portion of the shoulder 2 rearwardly of the groove 10 as viewed in FIG. 1 but leaves a forwardly extending ridge 14 between the shoulder 2 and the groove 13.

The rod 9 is slidably mounted within the body A in the bores 6 and 8. Normally the rod 9 protrudes from the tapered front end 4 of the body A about 1 inch with the spur or hook 11 seated against the rear end 15′ of the groove 10 to the rear of groove 13. The spring 7 which is held under pressure between the front end

2

15 of the bore 6 and the nut 16 on the rod 9 tends to hold the rod 9 in its retracted position as shown in FIGS. 1, 2 and 3 but permits it to be pulled forward to move the spur 11 out of the groove 10 and beyond the front end of the tapered portion 4. When released the rod 9 returns under the action of the spring 7 to its retracted position. The rear end of the bore 6 is closed by a screw threaded plug 17 which serves to limit the backward movement of the rod 9.

Mounted on the upper side of the body A as viewed in FIG. 2 are the clip 12, referred to above, and the threader 18. The clip 12 has three functions (a) as a pocket clip (b) to hold the fish hook in position to be threaded and (c) to cut the line. Clip 12 is pivoted at 19 to the plate 20 mounted on and extending radially from the body A. The clip 12 has a finger grip 21 at its rear end and a prong 22 at its front end which normally rests in a corresponding depression 23 in the body A. The clip 12 is held in its closed position shown in FIG. 2 by the spring 24 which also permits the clip to be moved to its open position shown in FIG. 3. A notch 25 in the upper edge of the plate 20 and a corresponding notch 26 in the clip 12 serve as a cutter to clip off any surplus line after the line has been tied to the hook.

The threader 18 comprises the forwardly and downwardly inclined substantially flat portion 27 which normally is engaged by the straight edge 28 of the clip 12. In use the shank or stem of a fish hook 37 is gripped adjacent to the eye thereof between the straight edge 28 of the clip 12 and the flat portion 27 of the threader 18. By the side of the flat surface 27 and on the other side of the clip 12 is the guide funnel 29. This guide funnel 29 has a conical bore 30 at its rear end and a conical bore 31 at its front end, said two bores meeting at about the middle of the guide at an opening 32 which is only large enough to permit easy passage of the fish line. A longitudinal slit 33 extends inwardly into said bores 30 and 31 and the opening 32. A notch 34 in the side wall of the bore 31 adjacent to the flat surface 27 is provided to receive the stem of the fish hook when the eye thereof is inserted in the bore 31.

In the concrete embodiment illustrated it has been found convenient to make the threader 18 unitary, consisting of a base plate 35 attached to the cylindrical portion 1 of the body A and having the flat surface 27 on one side and the guide 29 on the other side of the closed position of the front end of the clip 12. As shown at 36 the corners of the wall of the conical bore 30 adjacent to the slit 33 are cut away to facilitate insertion of the end of the fish line.

The knot tying device described above is used as follows.

The edge 28 of the clip 12 is raised off of the surface 27 by depressing the finger grip 21 and a fish hook is inserted with its shank at right angles to the body A, with its eye in the conical socket 31 and with its shank extending out through the notch 34 where it is held between the edge 28 and the surface 27. The free or short end of the line is inserted into the bore 30, through the hole 32, through the eye of the hook and out through the bore 31. At least about 4 inches of line is drawn through the eye of the hook and held against the tapered end 4. Then the other or long end of the line which normally is attached to the reel is brought up through the slit 33 and down over the taper 4 and along the pin 9 and is held to the pin 9 and the taper 4 by the fingers of the operator. Then the short end of the line is wound tightly, preferably three turns, around the cylinder 3 and the long end of the line and brought around through the slot 13, and held against the cylindrical portion 1. The long end of the line is then released and the pin 9 with the spur 11 are pulled forward while at the same time releasing the short end of the line. The spur 11 catches the turn of the short end of the line lying in the groove 13 and pulls the free end of the line through the several turns of the line on the cylinder 3 forming the beginning of a knot. Then the hook is released by raising the clip 12 and the line together with the hook is removed from the body A and the partially formed knot is drawn tight and slipped up tightly to the eye of the hook. The surplus free end of the line is then cut off by means of the cutter 25, 26.

It will be appreciated that the knot tying device may be made of any suitable material and of any suitable size. A size about two thirds as large as the actual size shown in the drawings has been found to be suitable for all commonly used hooks including fly hooks.

I claim:

1. A knot tying device comprising an elongated handle having a larger portion adapted to be gripped by the hand of the operator and a realtively smaller end portion separated from said larger portion by a shoulder, an axial bore extending through said handle, a rod slidably mounted in said bore and normally protruding a substantial distance from the front end thereof, a first slit in said handle extending radially inwardly from the outer surface thereof to said bore and longitudinally from the front end of said smaller end portion to a short distance into said larger portion, a second slit extending only partly around said larger portion and inwardly from the surface thereof to said bore and angularly to the longitudinal axis of said handle from said shoulder at one end to a short distance into said larger portion at its other end and intersecting said first slit at a substantial distance behind said shoulder and at a substantial distance in front of the rear end of said first slit, a spur carried by and extending outwardly from said rod and normally positioned at the rear end of said first slit and means for removably supporting a fish hook on said handle.

2. A knot tying device as defined in claim 1 in which said smaller end portion of said handle is tapered toward the free end thereof.

3. A knot tying device as defined in claim 1 comprising a spring in said axial bore and engaging said rod and tensioned to hold said rod in retracted position with said spur positioned at the rear end of said first slit.

4. A knot tying device as defined in claim 1 in which said means for supporting a fish hook on said handle comprises a supporting surface on said handle and a spring operated clip pivotally secured to said handle and positioned to engage the shank of a fish hook lying on said supporting surface.

5. A knot tying device as defined in claim 4 in which said spring operated clip comprises a cutter.

6. A knot tying device as defined in claim 4 in which said means for supporting a fish hook on said handle comprises an externally cylindrical threader secured to said handle adjacent to said clip, said threader having a rearwardly tapered conical bore in its front end adapted to receive the eye of a fish hook, a forwardly tapered conical bore in its rear end adapted to receive and guide the end of a fish line, a hole connecting the smaller ends of said two conical bores and a slit extending radially inwardly from the outer surface of said threader into said conical bores and said hole and longitudinally from one end thereof to the other end thereof.

7. A knot tying device as defined in claim 1 in which said means for supporting a fish hook on said handle comprises an externally cylindrical threader secured to said handle, said threader having a rearwardly tapered conical bore in its front end adapted to receive the eye of a fish hook, a forwardly tapered conical bore in its rear end adapted to receive and guide the end of a fish line, a hole connecting the smaller ends of said two conical bores and a slit extending radially inwardly from the outer surface of said threader into said conical bores and said hole and longitudinally from one end thereof to the other end thereof.

8. A knot tying device as defined in claim 1 in which said handle has a substantially flat gripping surface adjacent to the front end of said larger portion thereof.

References Cited by the Examiner

UNITED STATES PATENTS

| | | | |
|---|---|---|---|
| 3,086,802 | 4/1963 | Keston | 289—17 |
| 3,101,964 | 8/1963 | Reaser | 289—17 |
| 3,106,417 | 10/1963 | Clow | 289—17 |
| 3,131,957 | 5/1964 | Musto | 289—17 |
| 3,177,021 | 4/1965 | Benham | 289—17 |

DONALD W. PARKER, *Primary Examiner.*

L. K. RIMRODT, *Assistant Examiner.*